United States Patent [19]

Ishino

[11] Patent Number: 5,555,273
[45] Date of Patent: Sep. 10, 1996

[54] AUDIO CODER

[75] Inventor: Toshiyuki Ishino, Tokyo, Japan

[73] Assignee: NEC Corporation, Tokyo, Japan

[21] Appl. No.: 361,218

[22] Filed: Dec. 21, 1994

[30] Foreign Application Priority Data

Dec. 24, 1993 [JP] Japan ................................. 5-326776

[51] Int. Cl.$^6$ ........................... H04B 14/04; H04B 14/06; G10L 3/02; G10L 9/00
[52] U.S. Cl. ......................... 375/244; 375/240; 375/243; 375/245; 395/2.38; 395/2.39; 395/2.91; 395/2.92; 395/2.94; 395/2.95
[58] Field of Search .................................. 375/240, 243, 375/244, 245; 381/29–36, 41; 395/2.38, 2.39

[56] References Cited

U.S. PATENT DOCUMENTS

| 5,084,904 | 1/1992 | Daito | 375/245 |
|---|---|---|---|
| 5,089,818 | 2/1992 | Mahieux | 375/245 |
| 5,091,955 | 2/1992 | Iseda | 381/36 |
| 5,113,448 | 5/1992 | Nomura | 381/30 |
| 5,115,469 | 5/1992 | Taniguchi | 381/34 |
| 5,285,498 | 2/1994 | Johnston | 395/2.39 |
| 5,353,375 | 10/1994 | Goto | 395/2.38 |

FOREIGN PATENT DOCUMENTS 3-171828  7/1991  Japan .

*Primary Examiner*—Stephen Chin
*Assistant Examiner*—Vijay Shankar
*Attorney, Agent, or Firm*—Foley & Lardner

[57] ABSTRACT

Quantizing section 1 input audio signal data with a quantizing step width. First predicting section 14 predicts a quantization step width to be supplied to the quantizing section on the basis of the input audio signal and a number of bits of quantized data. Second predicting section 15 predicts the quantization step width on the basis of the input audio signal and a number of bits of quantized data. Coding section 2 performs Huffman coding on the quantized data. Calculating section 3 calculates the number of bits per unit time of the coded sequence signal. Selecting section 16 selects either one of the first and second predicting sections 14 and 15 on the basis of the input audio signal and the number of bits of quantized data. The first predicting section 14 further predicts another wider quantizing step width by a predetermined step width when the number of bits calculated is exceeded a predetermined value B. The selecting section 16 selects the first predicting section 14 when the number of bits calculated by the calculating section 3 is exceeded a predetermined value B but is not exceeded a threshold value N and selects the first predicting section 15 when the number of bits calculated by the calculating section 3 is exceeded a predetermined value and a threshold value N.

3 Claims, 2 Drawing Sheets

AUDIO CODER

BACKGROUND OF THE INVENTION

The present invention relates to an audio coder using entropy coding, i.e., Huffman coding capable of reduction of the amount of calculations in the encoders.

FIG. 2 shows a conventional audio coder having a Huffman coding. In the coding operation, a quantization step width predictor 4 first predicts a quantization step width from input data, and according to this quantization step width a quantizer 1 performs a quantization process. Based on the quantization data calculated in the quantizer 1, a Huffman table is selected, and Huffman coding is performed according to the selected table data in a Huffman coder 2. Then, the number of bits per unit time, for example per second, of the data obtained as a result of the Huffman coding are counted for comparison with a predetermined value B of the bit rate information which is the number of bits per unit time, for example, per second. If the counted bit number is not in excess of the predetermined value B, a process for one frame is completed. If the counted bit number (amount of codes generated) from the Huffman coder 2 is in excess of the predetermined value, the quantization is performed in the quantizer 1 with the quantization step width increased by one step. The above series of counted processes are repeatedly executed until the counted bit number is less than the predetermined value B.

In Japanese Patent Laid-Open Publication No. Hei 3-171828, there is disclosed a reduction technique of the amount of the calculations by using vector quantization. In this technique, provided is a codebook comprising codevectors classified into groups according to the property of the input data. The property of the input data is judged by the property judging means. The codevector in groups corresponding to the judged result is retrieved. According to this technique, the number of vectors to be retrieved is decreased and the amount of calculations required for the optimum vector determination.

In the above method, the calculation amount may be reduced when the series of processes of the quantization, Huffman coding and bit number calculation are completed in one time, or the number of the repeated calculations is small. However, if the step width of the first quantization is greatly different from the appropriate one for the bit rate information, it is necessary to repeat the processes of the quantization, Huffman coding and bit number calculation for a considerable number of times, whereby the amount of calculations is increased.

SUMMARY OF THE INVENTION

An object of the present invention is therefore to provide an audio coder using entropy coding capable of reduction of the amount of calculations in the encoders.

According to the present invention, there is provided an audio coder comprising: quantizing means for quantizing input audio signal data with a quantizing step width, first predicting means for predicting the quantization step width to be supplied to the quantizing means on the basis of the input audio signal and a number of bits of quantized data, second predicting means for predicting the quantization step width on the basis of the input audio signal and a number of bits of quantized data, coding means for performing Huffman coding on the quantized data by the quantizing means, calculating means for calculating the number of bits per unit time of the coded sequence signal obtained through coding in the Huffman coding means, and selecting means for selecting either one of the first and second predicting means on the basis of the input audio signal and a number of bits of quantized data, the first predicting means predicting another wider quantizing step width by a predetermined step width when the number of bits calculated by the calculating means is exceeded a predetermined value, and the selecting means selecting said first predicting means when the number of bits calculated by the calculating means is exceeded a predetermined value but is not exceeded a threshold value and selecting the second predicting means when the number of bits calculated by the calculating means is exceeded the predetermined value and the threshold value.

Other objects and features will be clarified from the following description with reference to attached drawings.

DETAILED DESCRIPTION OF THE EMBODIMENT

Figure 1:
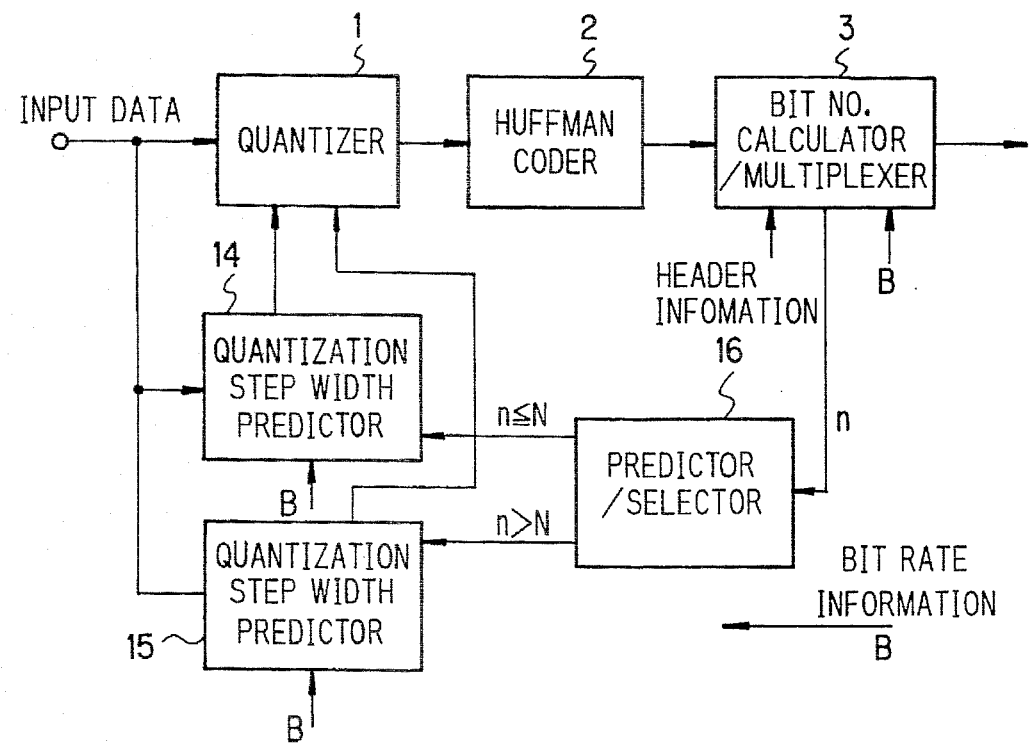
FIG. 1 shows a block diagram of an audio coder according to an embodiment of the present invention.
Figure 2:
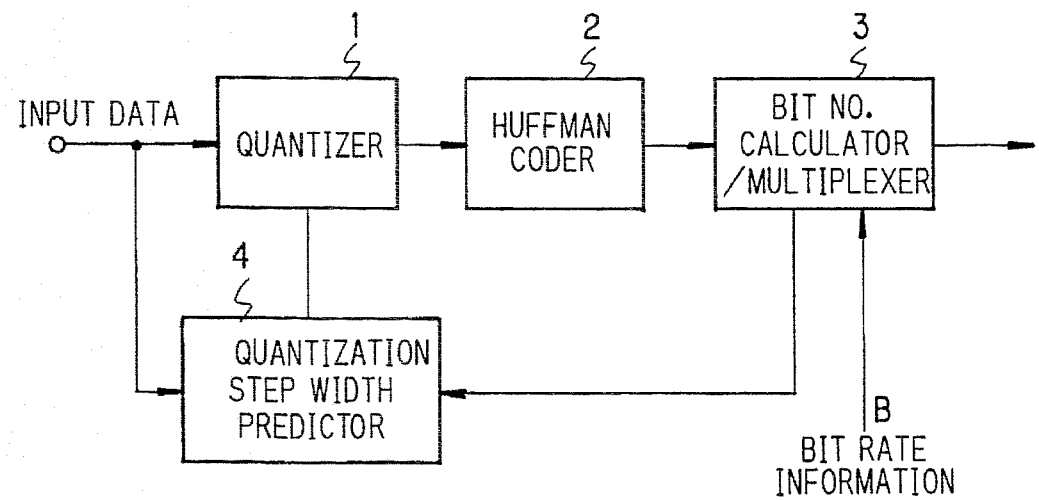
FIG. 2 shows a conventional audio coder having a Huffman coding.

Now, the embodiment of the present invention will be described. FIG. 1 is a block diagram showing an embodiment of the present invention. Referring to FIG. 1, the embodiment comprises a quantizer 1 for quantizing input audio signal data, quantization step width predictors 14 and 15 for predicting the quantization step width from the supplied input audio signal, a predictor/selector 16 for selecting one of the two quantization step width predictors 14 and 15, a Huffman coder 2 for Huffman coding quantized data from the quantizer 1, and a bit number calculator/multiplexer 3 for calculating the bit number of coded sequence signal obtained from the Huffman coder 2 and for multiplexing the code sequence signal from the Huffman coder 2.

Figure 3:
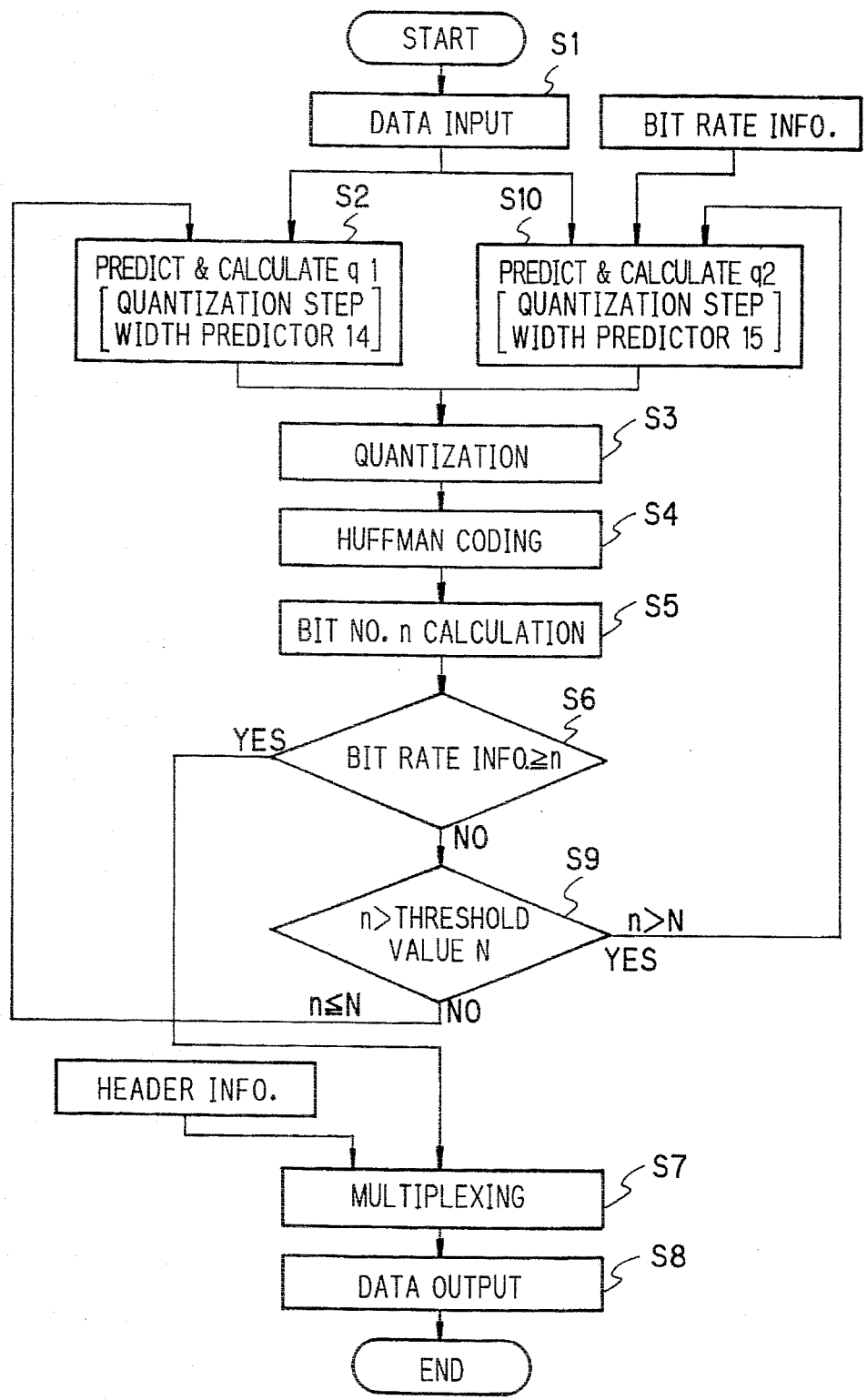
FIG. 3 shows a flowchart of an operation of the audio coder shown in FIG. 1.

The operation of the audio coder shown in FIG. 1 will now be described with reference to the flow chart of FIG. 3. In the first step, the input data is supplied to the quantization step width predictor 14 (Step 1) for predicting and calculating a quantization step width q1 which is determined on the basis of the input data (Step S2). The quantizer 1 executes first quantization for a certain frame by using the data of the quantization step width q1 to produce quantized data which is to be supplied to the Huffman coder 2 (Step S3). The Huffman coder 2 executes Huffman coding to produce the coded sequence signal which is to be supplied to the bit number calculator/multiplexer 3 (Step S4).

The bit number calculator/mutiplexer 3 calculates the number (n) of the bits per second of the coded sequence signal obtained through the Huffman coding (Step S5), and compares the calculated bit number (n) with the predetermined value B of the bit rate information (Step S6). If the number (n) not exceed the predetermined value B, the bit number calculator/multiplexer 3 multiplexes the coded data together with an applied header data (Step S7) and produces a bit stream (Step S8). If the number (n) produced from the Huffman coder 2 is exceeded by the predetermined value B of the bit rate information, the coded bit number n is supplied to the predictor/selector 16 for comparison with a threshold value N (Step S9). If the bit number n exceeds the threshold value N, the quantization step width predictor 15 predicts and calculates another quantization step width q2 (Step S10) based on the bit rate information and the input data. In the Step S10, the quantization step width q2 is determined such as to reduce the amount of the coded data having been obtained using the appropriate Huffman table for coding. The quantizer 1 executes quantization again by using the quantization step width q2 predicted in the quantization step width predictor 15. If the quantized bit number n does not exceed the threshold value N, the quantization step width q1 predicted in the quantization step width predictor 14 is updated by one step to q1' and the quantization in the quantizer 1 is performed based on the quantization step q1'. This repetitive process is carried out until the coded bit number is less than the predetermined value of the bit rate information. Subsequently, the bit number calculator/multiplexer 3 multiplexes the coded data together with the applied header data to produce a bit stream.

It is easily understandable that the present invention may be applied to a coder or coding method of sound signals including speech signal, audio sound signal and other sound signals.

As has been described in the foregoing, according to the present invention it is possible to reduce the amount of the calculations in the entropy coding such as Huffman coding without deterioration in the quality of coding even when there is a great difference between the predetermined bit rate information and the information of number of bits coded data.

Changes in construction will occur to those skilled in the art and various apparently different modifications and embodiments may be made without departing from the scope of the invention. The matter set forth in the foregoing description and accompanying drawings is offered by way of illustration only. It is therefore intended that the foregoing description be regarded as illustrative rather than limiting.

What is claimed is:

1. An audio coder comprising:

quantizing means for quantizing input audio signal data with a quantization step width and outputting quantized data as a result thereof;

first predicting means for predicting the quantization step width to be supplied to said quantizing means on a basis of the input audio signal data and a number of bits of the quantized data;

second predicting means for predicting the quantization step width on the basis of the input audio signal data and the number of bits of the quantized data;

coding means for performing Huffman coding on the quantized data output by said quantizing means;

calculating means for calculating a number of bits per unit time of a coded sequence signal obtained through coding in said coding means; and selecting means for selecting either one of said first and second predicting means on the basis of the input audio signal data and the number of bits of the quantized data, wherein said first predicting means further predicts another wider quantizing step width by a predetermined step width when the number of bits calculated by said calculating means exceeds a predetermined value, and wherein said selecting means selects said first predicting means when the number of bits calculated by said calculating means exceeds the predetermined value but does not exceed a threshold value N and selects said second predicting means when the number of bits calculated by said calculating means exceeds the predetermined value and the threshold value N.

2. An audio coder as set forth in claim 1, further comprising multiplexing means for the coded sequence signal when the number of bits calculated by said calculating means does not exceed the predetermined value.

3. An audio coding method comprising steps of:

a first step for predicting and calculating a quantization step width q1 which is determined on a basis of input data;

a second step for executing a first quantization for a certain frame on the input data with the quantization step width q1 to produce quantized data;

a third step for executing Huffman coding on the quantized data to produce a coded sequence signal;

a fourth step for calculating the number (n) of the bits per second of the coded sequence signal obtained through the Huffman coding and comparing the calculated bit number (n) with a predetermined value B of a predetermined bit rate;

a fifth step for multiplexing the coded sequence signal together with an applied header data to produce a first bit stream if the calculated bit number (n) does not exceed the predetermined value B;

a sixth step for, if the calculated bit number (n) exceeds the predetermined value B and exceeds a threshold value N, predicting and calculating another quantization step width q2 which is determined such as to reduce an amount of the coded sequence signal having been obtained using the Huffman coding;

a seventh step for executing the first quantization again by using the quantization step width q2;

an eighth step for, if the calculated bit number (n) does not exceed the threshold value N, predicting an updated quantization step width q1' updated by one step for the first quantization in said second step;

a ninth step for carrying out said first through eighth steps until the calculated bit number (n) is less than the predetermined value B; and a tenth step for multiplexing the coded sequence signal together with an applied header data to produce a second bit stream when the calculated bit number (n) is less than the predetermined value B.

* * * * *